(12) United States Patent
Bishop et al.

(10) Patent No.: US 11,306,518 B2
(45) Date of Patent: Apr. 19, 2022

(54) VEHICLE DOOR LOCK, ESPECIALLY TAILGATE LOCK

(71) Applicant: Kiekert AG, Heiligenhaus (DE)

(72) Inventors: Bryan D. Bishop, Walled Lake, MI (US); Keith Robertson, Livonia, MI (US); John Dey, Wixom, MI (US)

(73) Assignee: Kiekert AG, Heiligenhaus (DE)

( * ) Notice: Subject to any disclaimer, the term of this patent is extended or adjusted under 35 U.S.C. 154(b) by 593 days.

(21) Appl. No.: 15/909,022

(22) Filed: Mar. 1, 2018

(65) Prior Publication Data

US 2018/0252004 A1 Sep. 6, 2018

Related U.S. Application Data

(60) Provisional application No. 62/465,973, filed on Mar. 2, 2017.

(51) Int. Cl.
| | |
|---|---|
| *E05B 81/18* | (2014.01) |
| *E05B 85/26* | (2014.01) |
| *E05B 85/24* | (2014.01) |
| *E05B 81/64* | (2014.01) |
| *E05B 81/20* | (2014.01) |

(Continued)

(52) U.S. Cl.
CPC .............. *E05B 81/18* (2013.01); *E05B 81/20* (2013.01); *E05B 81/64* (2013.01); *E05B 83/00* (2013.01);
(Continued)

(58) Field of Classification Search
CPC .......... E05B 81/00; E05B 81/14; E05B 81/16; E05B 81/18; E05B 81/20; E05B 81/28; E05B 81/64; E05B 81/66; E05B 81/68; E05B 81/72; E05B 81/74; E05B 83/00; E05B 83/16; E05B 83/18; E05B 85/243; E05B 85/26; E05B 79/20; Y10T 292/1044; Y10T 292/1047; Y10T 292/1078; Y10T 292/1082; Y10S 292/23; Y10S 292/43;
(Continued)

(56) References Cited

U.S. PATENT DOCUMENTS 4,762,348 A * 8/1988 Matsumoto ............. E05B 81/20
                                                        292/201
4,848,031 A * 7/1989 Yamagishi ............... E05B 81/20
                                                         49/280

(Continued)

FOREIGN PATENT DOCUMENTS

| DE | 10 2006 020 344 A1 | 10/2007 |
|---|---|---|
| DE | 10 2015 107 955 A1 | 11/2016 |

(Continued)

*Primary Examiner* — Alyson M Merlino
(74) *Attorney, Agent, or Firm* — Renner, Otto, Boisselle & Sklar, LLP

(57) ABSTRACT

The subject matter of the present invention is a motor vehicle door lock, in particular tailgate lock, which is provided with a locking mechanism (1, 2) essentially consisting of a rotary latch (1) and a pawl (2). Furthermore, as required, an unlocking/opening actuator (6) as well as a locking actuator (7) may be realised. In addition at least one sensor (12, 13) assigned to the locking actuator (7) is provided. According to the invention the sensor (12, 13) is arranged at a distance from a locking mechanism plane protected in the lock interior, and is impacted by means of an actuating element (14) following the locking actuator (7).

18 Claims, 3 Drawing Sheets

(51) Int. Cl.
*E05C 3/00* (2006.01)
*E05B 83/00* (2014.01)
*E05B 83/18* (2014.01)
*B62D 33/037* (2006.01)
*E05B 79/20* (2014.01)
*E05B 81/28* (2014.01)

(52) U.S. Cl.
CPC ............ *E05B 83/18* (2013.01); *E05B 85/243* (2013.01); *E05B 85/26* (2013.01); *E05C 3/004* (2013.01); *B62D 33/037* (2013.01); *E05B 79/20* (2013.01); *E05B 81/28* (2013.01); *E05Y 2400/445* (2013.01); *E05Y 2900/546* (2013.01)

(58) Field of Classification Search
CPC .. E05C 3/004; E05Y 2400/445; B62D 33/037
See application file for complete search history.

(56) References Cited

U.S. PATENT DOCUMENTS

| | | | | |
|---|---|---|---|---|
| 6,048,003 A * | 4/2000 | Shimura | ................. | E05B 81/20 292/201 |
| 2003/0094818 A1 * | 5/2003 | Tomaszewski | ......... | E05B 81/16 292/195 |
| 2013/0049379 A1 * | 2/2013 | Yokota | .................... | E05B 81/20 292/129 |
| 2013/0249222 A1 * | 9/2013 | Yokomori | ............... | E05B 81/20 292/201 |
| 2014/0000169 A1 * | 1/2014 | Yokomori | ............... | E05B 81/20 49/349 |
| 2014/0001771 A1 * | 1/2014 | Shibayama | ............. | E05B 81/20 292/100 |
| 2014/0070549 A1 * | 3/2014 | Hanaki | ................... | E05B 81/20 292/200 |
| 2016/0060914 A1 * | 3/2016 | Hiramoto | ................ | E05B 81/20 292/195 |
| 2016/0062365 A1 * | 3/2016 | Yamashita | .............. | E05B 81/20 318/468 |
| 2016/0145913 A1 * | 5/2016 | Machida | ................. | E05B 79/20 292/196 |
| 2017/0130492 A1 * | 5/2017 | Machida | ................. | E05B 81/20 |
| 2017/0268265 A1 * | 9/2017 | Hiramoto | ................ | E05B 81/20 |

FOREIGN PATENT DOCUMENTS

DE 10 2015 108 739 A1 12/2016
WO 2016/184452 A1 11/2016

* cited by examiner

VEHICLE DOOR LOCK, ESPECIALLY TAILGATE LOCK

This application claims the provisional benefit of U.S. Provisional Patent Application No. 62/465,973 filed Mar. 2, 2017, which is hereby incorporated herein by reference.

FIELD OF INVENTION

The invention relates to a motor vehicle door lock, in particular tailgate lock, with a locking mechanism essentially consisting of a rotary latch and a pawl, further with, as required, an unlocking/opening actuator and a locking actuator, and with at least one sensor assigned to the locking actuator.

BACKGROUND OF INVENTION

With a motor vehicle door lock of the type mentioned in the beginning, as is described for example in the DE 10 2006 020 344 A1, an unlocking/opening actuator is realised, with the aid of which a pawl can immediately be lifted off the respective rotary latch. This process, in this context, is called "quick release", but it is also known in the literature as "electrical opening". In addition the known motor vehicle door lock is equipped with a locking actuator. The locking actuator has a sensor assigned to it, which in the present case detects a contactless actuation of the respective motor vehicle door, but in principle can also be used in conjunction with the closing operation.

Moreover the DE 10 2015 107 955 A1 describes a drive unit, which is suitable and provided for opening and/or closing a motor vehicle door lock. With the aid of the known drive unit "electrical opening" can indeed be realised in the same way as "electrical closing". To this end the drive unit comprises an electric motor and a transmission element, which comprises a cable pull as well as a final control element, which is movable in relation to the cable pull. The final control element is acted upon with the aid of the electric motor and for example a spur gear unit arranged in between.

The state of the art has in principle proven successful. However, in practice there is an increasing demand for providing a particularly robustly designed motor vehicle door lock and in particular a tailgate lock, which is, or can be, used in particular in conjunction with so-called pick-ups. Such pick-ups typically comprise an open loading platform, the rear door or tailgate of which is equipped with one or more tailgate locks. In order to open the tailgate, the tailgate lock under discussion has to be opened as a rule by remote control.

This can be accomplished by switches provided inside the motor vehicle and an electromotive actuation or mechanically via cable pulls. Insofar the unlocking/opening actuator for quick-release or for electric opening is presently provided as an option, because a simple mechanical opening operation by means of a Bowden cable can be employed alternatively in its place.

In all cases however, a locking actuator is regularly provided because the relevant tailgates of such pick-ups are often very heavy, therefore significant locking forces are required to open the tailgate lock.

The known motor vehicle door locks with locking actuator can, albeit, be used in conjunction with such tailgate locks in particular for pick-ups. However, particularly rough environmental conditions have been observed in this field and on the open loading platform. Not only does this include that often the relevant tailgate lock when the pick-up is parked outdoors is exposed to moisture and rain. Other impurities as well such as dust, earth etc. have also been observed during the intended use and need to be kept permanently under control. Therefore improvements are required in this area in order to maintain the operability of such tailgate locks in the long term.

SUMMARY OF INVENTION

Therefore, the present invention is based on the technical problem of further developing a motor vehicle door lock of this kind, in particular a tailgate lock, in such way that a design is achieved, which ensures long-term operability of such tailgate locks even in rough environmental conditions.

To solve this technical problem, a generic motor vehicle door lock in terms of the invention is characterised in that the at least one sensor for the locking actuator is arranged at a distance from a locking mechanism plane, protected in the lock interior and impacted by means of an actuating element following the locking actuator.

In contrast to the state of the art, where the at least one sensor assigned to the locking actuator directly queries a position of the locking mechanism as described for example in the DE 10 2015 108 739 A1, the sensor in terms of the invention is arranged and laid out explicitly at a distance from the respective locking mechanism plane. Moreover the sensor is arranged in direction of the lock interior and protected there. This means, that although the locking mechanism plane with a fish mouth realised at this position is at least partially visible from outside in a lock case for mounting the locking mechanism typically via the fish mouth and thus accessible to dirt or even water, the sensor, in terms of the invention, is arranged explicitly at a distance from this locking mechanism plane and thus distant also from the fish mouth, protected in the lock interior. So as to enable the sensor to still query the position of the locking mechanism, it is acted upon with the aid of the actuating element following the locking actuator.

In detail, this is realised by advantageously configuring the actuating element following the locking actuator as an actuating cam non-rotatably attached to the rotary latch. This is, as a rule, accomplished by mounting the rotary latch, a closing lever as part of the locking actuator and the actuating element coaxially and at a distance from each other on a common axis. In this context it is advantageous to further proceed in such a way that the rotary latch, the closing lever and the actuating element are mounted in this order on the common axis.

In order to protect the sensor particularly effectively against the intrusion of water and also dirt, which might enter via the fish mouth into the motor vehicle door lock, provision is further made for the actuating element and the sensor to be attached to a mounting plate/arranged on this mounting plate, with the mounting plate lying opposite the fish mouth of the locking mechanism and essentially covering the same in a top view. That means that the mounting plate is arranged inside the motor vehicle door lock. In most cases the mounting plate extends predominantly parallel to the locking mechanism plane. The locking mechanism is then positioned between the lock case with the respective fish mouth on the one hand, and the mounting plate under discussion on the other. Besides the mounting plate, as regards its extension, is laid out such and configured such that when looking at the mounting plate from the top, this essentially covers the fish mouth in the lock case.

Since in addition, the actuating element and the sensor are attached to/arranged on a surface of the holding plate opposite the fish mouth, any water or dirt which might enter into the inside of the lock via the fish mouth, does not reach the sensor nor the actuating element. After all, dirt is held back from the opposite surface of the mounting plate, impacting, at most, the locking mechanism arranged between the lock case and the mounting plate. This is, however, not a problem insofar as the locking mechanism, as regards its layout and material selection, is adapted and arranged to cope with such exposure to water, dirt and the like.

In order to ensure additional protection the actuating element and the sensor are moreover advantageously covered by a housing. The housing may be detachably attached to the mounting plate in order to altogether simplify fabrication.

In addition the layout in this context is, in most cases, such that the actuating element and the sensor in conjunction with the mounting plate, except for a reach-through slot for the actuating element, are completely accommodated in the housing. That means that the housing and the mounting plate enclose the actuating element and the sensor. The enclosure realised in this way leaves only the reach-through slot open, via which the actuating element dips into the housing in order to impact the sensor.

In this context it has proven particularly effective if two sensors are provided. Advantageously both sensors are switches and in particular micro-switches. Such switches are particularly robust and low-cost.

In addition the layout used is advantageously such that the two sensors are acted upon one after the other during the closing operation with the aid of the actuating element. In this way, depending on whether a first or second sensor or both sensors are impacted, the functional positions differ between "open", "start of closing" and "end of closing"/"closed" of the locking mechanism.

As such, the "open" state corresponds e.g. to both sensors/switches being impacted. "Start of closing" is usually identified by the first sensor not being impacted with only the second sensor experiencing an impact. The state "end of closing" or the position "closed" of the locking mechanism finally regularly identifies the situation, in which both sensors are not impacted. In any event, it is possible to clearly distinguish between the previously described functional positions, using the two sensors. All this is achieved independently of any mechanical detent mechanisms or other mechanical movements of the locking mechanism. For effecting an impact on at least one sensor or on both sensors is undertaken solely with the aid of the actuating element, which in turn follows the locking actuator.

For this purpose the actuating element is advantageously configured as an actuating cam. Moreover the actuating element is non-rotatably attached to the rotary latch and in this way follows any rotary or swiveling movements of the rotary latch.

According to a further advantageous design of independent importance, provision is made for the optional unlocking/opening actuator as well as the locking actuator to be each constructed in a modular manner. That means, that both actuators each define a constructional unit, which can be fitted as a complete module into the motor vehicle door lock according to the invention. In case of the unlocking/opening actuator installation of the same is optional because the motor vehicle door lock according to the invention also explicitly permits a mechanical unlocking/opening actuator. Moreover the two actuators are preferably constructed in such a way as to be sealed. That means that the respective actuator defines, not only a constructional unit, but moreover a sealed constructional unit so that the actuator can be advantageously connected to a lock case as a complete constructional unit, but at the same time, due to its sealed layout, is protected against water or any dust or dirt, which intrudes or can intrude, into the inside of the motor vehicle door lock according to the invention. To this end both actuators are optionally and detachably attached to the respective lock case.

The procedure in most cases, consists in that the two actuators are arranged on an L-shank of the lock case, which is L-shaped in cross-section. The other L-shank, on the other hand, carries the locking mechanism and the at least one sensor/both sensors. Besides the layout is usually such that both the locking actuator and the optional unlocking/opening actuator each act upon the closing lever/the pawl via a connecting means. The actuator under discussion may therefore be one as has been described in the state of the art in the DE 10 215 107 955 A1. In most cases the actuator is designed as linear actuator.

In case of the optional unlocking/opening actuator the linear actuator acts upon the pawl via a rigid connecting means/a connecting rod. As a result the pawl can be swiveled, releasing the previously captive rotary latch in order to unlock/to open the locking mechanism. The rotary latch opens with the aid of a spring.

The locking actuator also is advantageously a linear actuator which in this case, on the outlet side, acts upon the core of a Bowden cable. The core of the Bowden cable under discussion is, in turn, connected to the end of the closing lever/hooked into the same. In this way control movements of the core of the Bowden cable relative to its sleeve lead to the closing lever being swiveled.

Since in the example, the closing lever is non-rotatably coupled to the rotary latch, the rotary latch consequently is simultaneously impacted in the closing direction. In principle both the closing lever and the locking actuator may, in this context, be generally designed for retrofitting. That means that the motor vehicle door lock may be altogether designed in a very simple way as a mechanically operated lock without unlocking/opening actuator and without locking actuator. In order to equip the motor vehicle door lock with the locking actuator, it is merely necessary to provide the at least one sensor, and to non-rotatably couple the closing lever, which can be retrofitted, to the rotary latch. Moreover the locking actuator must be attached to the lock case.

In any case, constructing the motor vehicle door lock according to the invention from a number of modules makes it possible to realise different lock variants in terms of a modular concept. Besides, it allows access to an especially robust locking mechanism which is of identical construction for all lock variants, made up of rotary latch and pawl. The modular design of the respective actuator in conjunction with its advantageously sealed layout moreover, ensures long-term operability.

BRIEF DESCRIPTION OF DRAWINGS

Further, since the at least one sensor/both sensors for controlling the closing operation are arranged at a distance from the locking mechanism and sealed inside the lock, any negative influence on their operability is also avoided. These are the essential advantages. The invention will now be described in detail with reference to merely one drawing showing an exemplary embodiment, in which.

DETAILED DESCRIPTION

Figure 1:
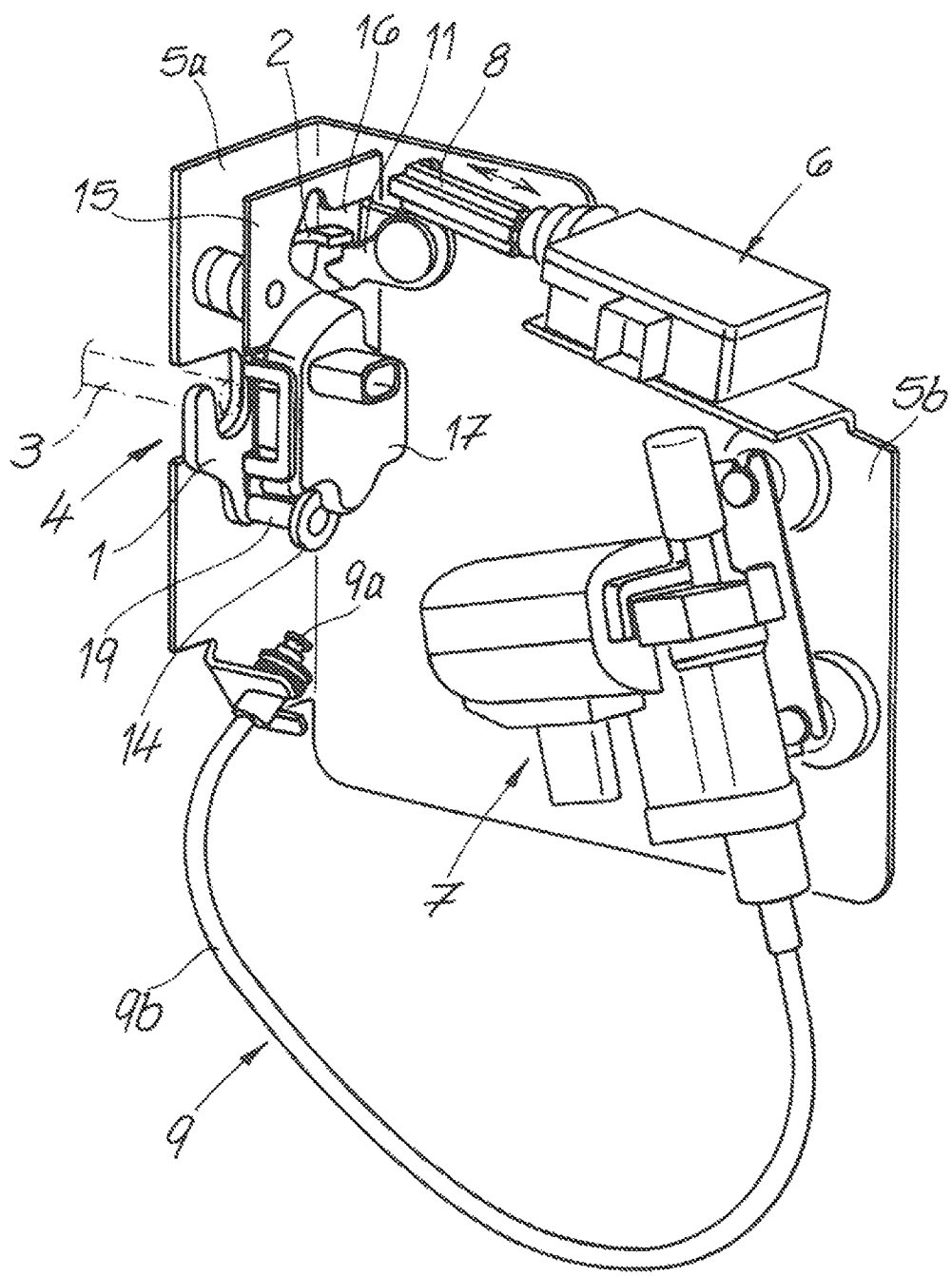
FIG. 1 shows the motor vehicle door lock according to the invention in a perspective overview.

In the figures a motor vehicle door lock is depicted which here is configured, without restriction, as a tailgate lock. In fact, the motor vehicle door lock under discussion is arranged, respectively, on the lateral edge of a tailgate of a motor vehicle with open loading platform, i.e. a so-called pick-up. It is emphasised that this is merely an example and does not imply any restrictions. Basic construction of the motor vehicle door lock includes, for a start, a locking mechanism 1, 2, which is composed essentially, of a rotary latch 1 and a pawl 2. The rotary latch 1 interacts with a locking bolt 3 indicated only in FIG. 1, which, via a fish mouth 4 in a lock case 5a, 5b, travels into the motor vehicle door lock and which, as is generally known, can interact with the locking mechanism 1, 2.

In the embodiment the lock case 51, 5b is L-shaped in cross-section. One can recognise a shorter L-shank 5a, on which the locking mechanism 1, 2 is mounted. In addition a longer L-shank 5b is realised. In the embodiment the longer L-shank 5b/the respective L-shank 5b has two actuators 6, 7 arranged on it/attached to it.

The actuator 6 is an optional unlocking/opening actuator. The further actuator 7 is configured as a locking actuator 7. This locking actuator 7 may generally be omitted if a closing function of the locking mechanism 1, 2 is to be waived. For this reason both actuators 6, 7 are each designed in a modular manner and may be fixed altogether as a constructional unit to the respective L-shank 5b/removed again from the same if required. In addition, both actuators 6, 7 are constructed in a sealed manner, in order to ensure their operability even in the case that water, dirt, dust etc. should intrude into the inside of the motor vehicle door lock shown.

Both actuators 6, 7 are designed here as linear actuators. To this end each actuator 6, 7 acts via a connecting means 8, 9 upon the pawl 2 on the one hand and upon a closing lever 10 on the other.

The connecting means 8, which is acted upon by the unlocking/opening actuator 6, is a connecting rod or adjusting rod 8. The connecting means or adjusting rod 8 acts upon a transmission lever 11. The transmission lever 11 is designed as a two-arm lever and rotatably mounted in the lock case 5a, 5b, here rotatably mounted on the L-shank 5b. A linear adjusting movement indicated in FIG. 1 and generated by the unlocking/opening actuator ensures that the transmission lever 11 is pivoted. For example, in order to undo the rotary latch 2, starting from the "closed" position of the locking mechanism 1, 2 as depicted in FIG. 1, the connecting means/the adjusting rod 8 is retracted by the unlocking/opening actuator 6.

This corresponds to a linear movement of the connecting means/the adjusting rod 8 towards the right. As a result the transmission lever 11 rotates clockwise about its axis, thereby lifting the pawl 2. The rotary latch 1 is thus freed from the pawl 2 and can open with the aid of a spring. The previously captive locking bolt 3 is also freed and the tailgate in the example can be opened. That means, the unlocking/opening actuator 6 ensures an "electrical opening" or "quick-release", as has been described above. Instead of the unlocking/opening actuator 6 the pawl 2 can alternatively be released from its engagement with the rotary latch 1 with the aid of a Bowden cable or a manually operated adjusting rod acting in a corresponding sense on the transmission lever 11. The unlocking/opening actuator 6 can in this case be omitted.

The locking actuator 7 is an actuator which is designed in a similar manner to that, which is described in detail in the DE 10 2015 107 955 A1 to which reference has already been made. In this case a connecting means in the form of a Bowden cable 9 is impacted with the aid of the locking actuator 7. The corresponding adjusting movements of the locking actuator 7 consist in that a core 9a is moved linearly back and forth relative to a sheath 9b of the Bowden cable 9.

Figure 3C:
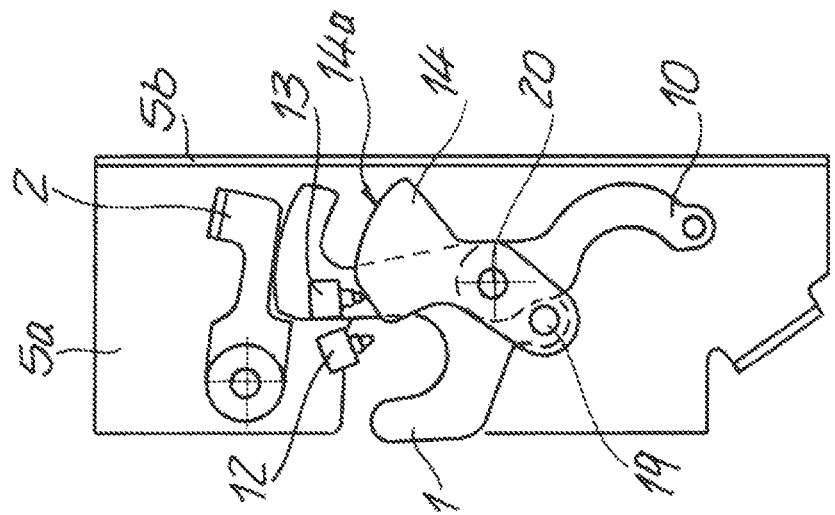
FIGS. 3A, 3B and 3C show the motor vehicle door lock according to the invention in a function sequence for a closing operation.
Figure 3B:
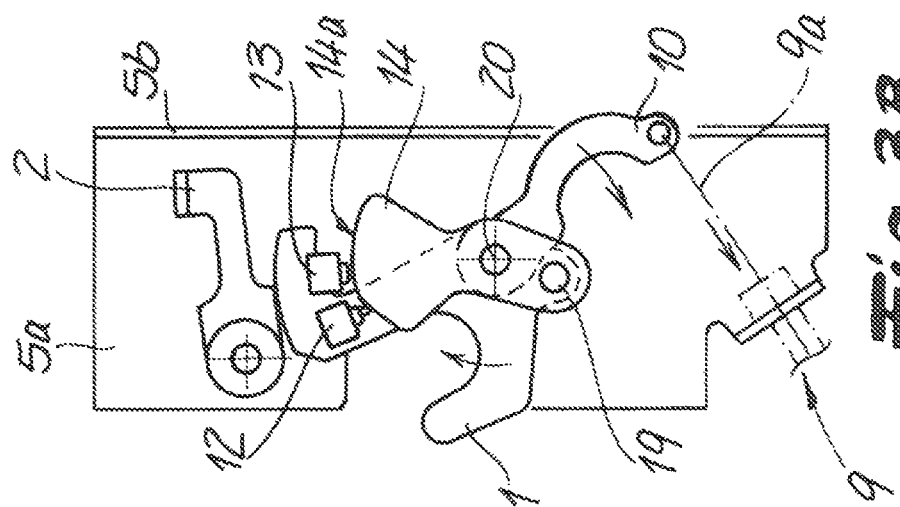
Figure 3A:
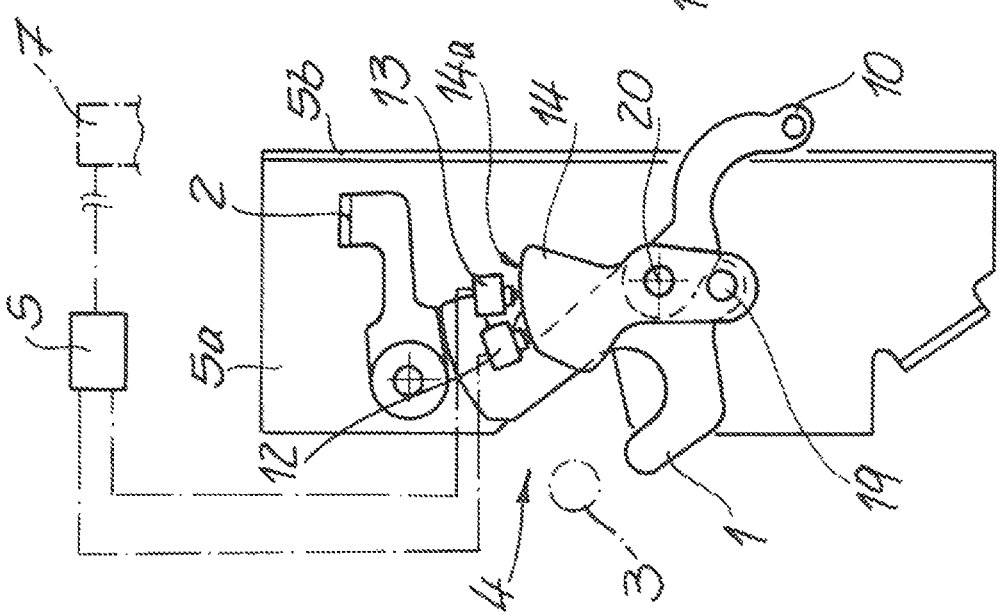

Since in the exemplary embodiment the core 9a of the Bowden cable 9 is attached to the closing lever 10, the closing lever 10 can swivel clockwise during the closing operation, as shown in FIGS. 3A to 3C and as will now be explained in detail.

The two connecting means 8, 9 are each sealingly connected to the respective actuator 6, 7. That means that the respective actuator 6, 7 together with the corresponding connecting means 8, 9 defines an associated constructional unit 6, 8; 7, 9, which can be attached to the lock case 5a, 5b not only as a complete module, but is also designed to be completely sealed as a whole. In consequence, all that is necessary when installing the module or the constructional unit 6, 8; 7, 9 under discussion, is to anchor it to the L-shank of the lock case 5a, 5b in the example on the one hand, and to couple the associated connecting means 8, 9 on the outlet side to the transmission lever 11 or the closing lever 10 on the other hand. Further assembly steps are not necessary. Besides the sealed design of the respective constructional unit 6, 8; 7, 9 ensures permanent and problem-free operability.

Figure 2A:
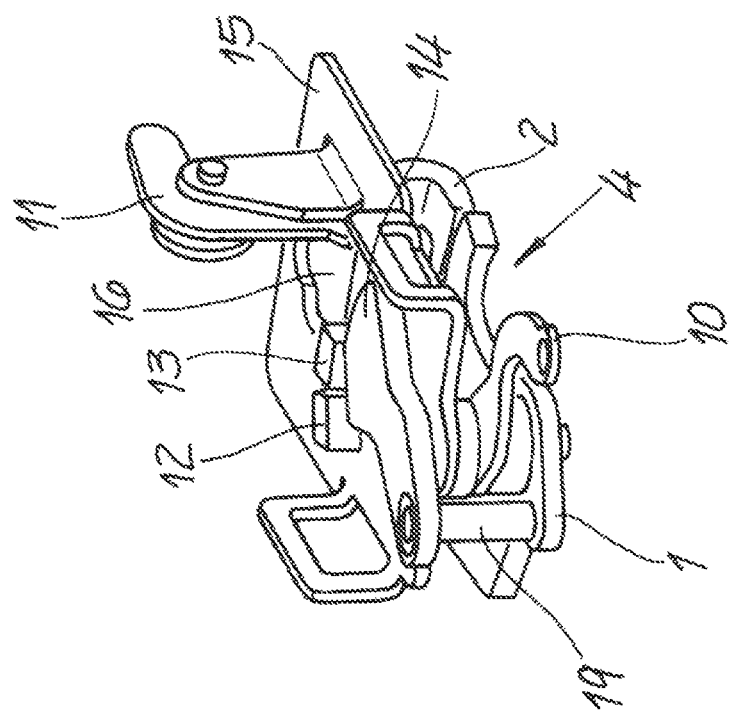
FIGS. 2A and 2B show a detail of FIG. 1 in the area of the sensors, partially with the housing removed.
Figure 2B:
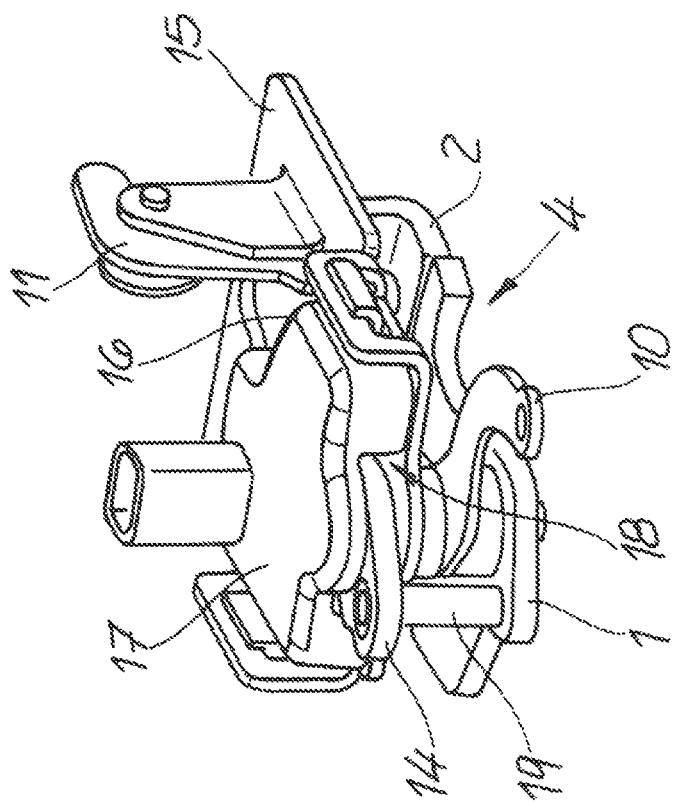

According to the exemplary embodiment the locking actuator 7 further has at least one sensor 12, 13 assigned to it. In the exemplary embodiment two sensors 12, 13 are realised. Both sensors 12, 13 are configured as a switch or micro-switch 12, 13. In the following a difference is made between a first sensor or switch 12 and a second sensor or switch 13. Both sensors 12, 13 are connected to a control unit S which is merely indicated and which, among others, is arranged and designed to impact the locking actuator 7. The control unit S could also impact the unlocking/opening actuator 6. According to the invention and very important is the fact that the respective sensor or both sensors 12, 13 are arranged inside the lock, at a distance from a locking mechanism plane, and protected. In addition the at least one sensor or both sensors 12, 13 are impacted with the aid of an actuating element 14, which follows the locking actuator 7. The actuating element 14, which can be recognised in particular in FIGS. 2A and 2B, is an actuating cam 14 in the exemplary embodiment. The actuating cam 14 has an actuating contour 14a which, depending on its position relative to the sensors or switches 12, 13 impacted thereby, is arranged such that with the aid of the actuating contour 14a the first sensor or switch 12, the second sensor or switch 13 or both sensors or switches 12, 13 are impacted or not impacted, as will now be explained below in further detail. As a result different functional positions can be realised, which are translated by the control unit S due to a corresponding impact on the locking actuator 7.

When viewing FIGS. 2A and 2B it becomes immediately clear that the sensor or sensors 12, 13 under discussion are arranged at a distance from the locking mechanism plane defined by the locking mechanism 1, 2. The two sensors 12, 13 are indeed positioned inside the motor vehicle door lock.

A mounting plate 15 is realised for this purpose. The two sensors 12, 13 and also the associated actuating element/actuating cam 14 are arranged on this mounting plate 15. The mounting plate 15, as regards its extension and design, is equipped such that when viewed from the top, it covers most of the fish mouth of the lock case 5a, 5b which, so to speak, lies underneath it. The mounting plate 15 lies opposite the fish mouth 4 of the lock case 5a, 5b. In fact, in the exemplary embodiment the layout shown is such that the mounting plate 15 is essentially aligned in parallel with the shorter L-shank 5a of the lock case 5a, 5b. Moreover the mounting plate 15 here is attached to the longer L-shank 5b of the lock case 5. Nevertheless, in order to enable the unlocking/opening actuator 6 to impact the transmission lever 11 via its adjusting rod 8 so that the pawl 2 can be lifted off the rotary latch 1, the mounting plate 15 is provided with a breakthrough 16 in the area of the pawl 2.

In particular in the area of the fish mouth 4 in the lock case 5a, 5b/the area where it is covered, the mounting plate 15 is however of closed design thus ensuring that when viewing the mounting plate 15 from the top, most of said fish mouth 4 is covered. In the exemplary embodiment, the actuating element/the actuating cam 14 and also the two sensors 12, 13 are arranged on the mounting plate 15, specifically on a surface opposite the fish mouth 4. The other surface of the mounting plate 15, by contrast, holds back any water or dirt, which might intrude through the fish mouth 4, so that the sensors 12, 13 as well as the associated actuating element 14 are protected against the intrusion of water, dirt and the like.

Additional protection for the actuating element/actuating cam 14 as well as for the sensors/switches 12, 13 impacted by it is provided by a housing 17. In FIG. 2A the housing 17 is shown mounted and a reach-through slot 18 can be recognised at the bottom of the housing 17, through which the actuating element 14 dips into the housing 17 under discussion. FIG. 2B, on the other hand, shows a situation in which the housing 17 has been removed. It can be recognised that the housing 17 is detachably attached to the mounting plate 15. This allows the housing 17 to be removed without difficulty. At the same time the housing 17 in conjunction with the mounting plate 15 ensures that the actuating element 14, which is inside together with the two sensors 12, 13, is completely enclosed except for the reach-through slot 18 for the actuating element 14.

As already explained in the beginning, the actuating element 14 follows the locking actuator 7. To this end the actuating element is non-rotatably attached to the rotary latch 1. This can be recognised in particular in FIGS. 2A and 2B. The non-rotatable coupling between the rotary latch 1 on the one hand and the actuating element 14 on the other, is catered for in the embodiment by a connecting pin 19. In addition the layout is such that the rotary latch 1, the locking actuator 10 and finally the actuating element/the actuating cam 14, in this order, are mounted coaxially and spaced apart from one another on a common axis 20.

The mode of operation is made clear by way of the closing operation shown in FIGS. 3A to 3C. In this closing operation the two sensors 12, 13 are impacted one after the other with the aid of the actuating element 14. In FIG. 3A the locking mechanism 1, 2 is shown in its "open" position. This corresponds to a position of the actuating element 14, where the actuating contour 14a impacts both sensors/switches 12, 13.

Now, if in this functional position shown in FIG. 3A, in which the locking mechanism 1, 2 is "open", the locking bolt 3 also indicated travels into the fish mouth 4 of the lock case 5a, 5b, the rotary latch 1 and with it the actuating element 14 are slightly swiveled clockwise about their common axis 20, until the position shown in FIG. 3B has been reached. The functional position shown in FIG. 3B corresponds to the "start of closing". In this case the actuating element 14 only impacts the second sensor/switch 13, whereas the first sensor/switch 12 is free from the actuating element 14/its actuating contour 14a.

When the functional position "start of closing" has been detected by the control unit S, i.e. by querying the two sensors 12 13, the control unit S ensures that the locking actuator 7 impacted by it is supplied with current. This leads to the locking actuator 7 impacting the closing lever 10 via the Bowden cable 9/its Bowden cable core 9a. In fact the closing lever 10 with the pawl 1 and the actuating element 14 swivels clockwise about the common axis 20. This is indicated by an arrow in FIG. 3B.

The closing operation continues until the functional position "end of closing"/"closed" of the locking mechanism 1, 2 has been reached, as shown in FIG. 3C. In this case both sensors 12, 13 are free of the actuating element 14 and are no longer impacted by its actuating contour 14a. As soon as the control unit S detects "end of closing", the locking actuator 7 stops. The locking mechanism 1, 2 is then in the "closed" state.

The invention claimed is:

1. A motor vehicle door lock for a tailgate, the motor vehicle door lock comprising:
   a locking mechanism having a rotary latch and a pawl,
   an unlocking/opening actuator for the locking mechanism,
   a locking actuator for the locking mechanism,
   a closing lever engageable between the locking actuator and the locking mechanism,
   at least one sensor configured to query a position of the rotary latch, wherein the at least one sensor is arranged at a distance from a locking mechanism plane and protected in a lock interior, and
   an actuating element configured to follow movement of the rotary latch, wherein the actuating element is configured to directly impact the at least one sensor,
   wherein the rotary latch, the closing lever, and the actuating element are coaxially mounted on on a common axis, wherein
   the at least one sensor is mounted to a first side of a mounting plate, the actuating element is arranged adjacent the first side of the mounting plate and extends along the first side of the mounting plate, and the locking mechanism is arranged adjacent a second side of the mounting plate opposite the first side and extends along the second side of the mounting plate, wherein the mounting plate covers a fish mouth associated with the locking mechanism to close the fish mouth relative to the at least one sensor and the actuating element arranged on the first side of the mounting plate, and wherein
   the closing lever extends along the second side of the mounting plate opposite the actuating element.

2. The motor vehicle door lock according to claim 1, wherein the actuating element is configured as an actuating cam non-rotatably attached to the rotary latch.

3. The motor vehicle door lock according to claim 1, wherein the actuating element and the at least one sensor are covered by a housing.

4. The motor vehicle door lock according to claim 3, wherein the housing is detachably attached to the mounting plate.

5. The motor vehicle door lock according to claim 4, wherein the housing accommodates the actuating element and the at least one sensor relative to the mounting plate, wherein the housing includes a reach-through slot for at least a portion of the actuating element.

6. The motor vehicle door lock according to claim 1, wherein both of the unlocking/opening actuator and the locking actuator are configured in a modular manner.

7. The motor vehicle door lock according to claim 1, wherein both of the unlocking/opening actuator and the locking actuator are detachably attached to a lock case.

8. The motor vehicle door lock according to claim 1, wherein both of the unlocking/opening actuator and the locking actuator are arranged on an L-shank of a lock case, which is L-shaped in cross-section, wherein another L-shank of the lock case supports the locking mechanism and the at least one sensor.

9. The motor vehicle door lock according to claim 1, wherein the locking actuator is configured to impact the closing lever and/or the unlocking / opening actuator is configured to impact the pawl via a connecting means.

10. The motor vehicle door lock according to claim 1, wherein the at least one sensor includes two sensors.

11. The motor vehicle door lock according to claim 10, wherein the two sensors, during a closing operation of the locking mechanism, are directly impacted in sequence by the actuating element.

12. The motor vehicle door lock according to claim 10, wherein depending on whether a first sensor or a second sensor of the two sensors is directly impacted by the actuating element or whether both of the two sensors are directly impacted by the actuating element, the locking mechanism is movable to different functional states including "open", "start of closing", and "end of closing"/ "closed".

13. The motor vehicle door lock according to claim 1, wherein the at least one sensor is configured as at least one switch.

14. The motor vehicle door lock according to claim 13, wherein the at least one switch is at least one microswitch.

15. The motor vehicle door lock according to claim 1, wherein the mounting plate is attached to a lock case, and the motor vehicle door lock further includes a housing attached to the mounting plate that is configured to at least partially enclose the actuating element and the at least one sensor relative to the mounting plate.

16. The motor vehicle door lock according to claim 1, wherein the rotary latch, the closing lever, and the actuating element are spaced along the common axis.

17. The motor vehicle door lock according to claim 1, wherein the closing lever and the actuating element are axially spaced along the common axis.

18. A motor vehicle door lock for a tailgate, the motor vehicle door lock comprising:
   a locking mechanism having a rotary latch and a pawl,
   an unlocking/opening actuator for the locking mechanism,
   a locking actuator for the locking mechanism,
   a closing lever engageable between the locking actuator and the locking mechanism,
   at least one sensor configured to query a position of the rotary latch, wherein the at least one sensor is arranged at a distance from a locking mechanism plane and protected in a lock interior, and
   an actuating element configured to follow movement of the rotary latch, wherein the actuating element is configured to directly impact the at least one sensor,
   wherein the rotary latch, the closing lever, and the actuating element are coaxially mounted on a common axis, wherein
   the at least one sensor is mounted to a first side of a mounting plate, the actuating element is arranged adjacent the first side of the mounting plate and extends along the first side of the mounting plate, and the locking mechanism is arranged adjacent a second side of the mounting plate opposite the first side and extends along the second side of the mounting plate, wherein the mounting plate covers a fish mouth associated with the locking mechanism to close the fish mouth relative to the at least one sensor and the actuating element arranged on the first side of the mounting plate, and wherein
   the closing lever and the actuating element are axially spaced along the common axis.

* * * * *